United States Patent [19]

Rotilio

[11] Patent Number: 4,524,260

[45] Date of Patent: Jun. 18, 1985

[54] ADAPTER KIT FOR TUNGSTEN-INERT-GAS TORCHES

[76] Inventor: James V. Rotilio, 329 Hackensack St., Carlstadt, N.J. 07072

[21] Appl. No.: 496,073

[22] Filed: May 19, 1983

[51] Int. Cl.³ .................................................. B23K 9/00
[52] U.S. Cl. ....................................... 219/75; 219/136
[58] Field of Search ................................... 219/75, 136

[56] References Cited

U.S. PATENT DOCUMENTS

| | | | |
|---|---|---|---|
| 3,296,407 | 1/1967 | Wallace | 219/75 |
| 3,739,140 | 6/1973 | Rotilio | 219/75 |
| 4,354,088 | 10/1982 | Rehrig | 219/75 |

*Primary Examiner*—Roy N. Envall, Jr.
*Assistant Examiner*—Alfred S. Keve
*Attorney, Agent, or Firm*—Martha G. Pugh

[57] ABSTRACT

A kit for adapting tungsten-inert-gas welding torches of conventional design to use high amperage current. This comprises an internally and externally screw-threaded tube of highly conductive heat-resistant material which is designed to screw onto a cable housing terminal on the torch body, an insulating gasket which seats against an external shoulder of the torch body, and an insulating sleeve which fits over the internally and externally screw-threaded tube in place on the cable housing terminal, and seats against the gasket. This combination provides gripping means for the operator of the welding torch while dissipating the heat generated by the high operating current.

4 Claims, 5 Drawing Figures

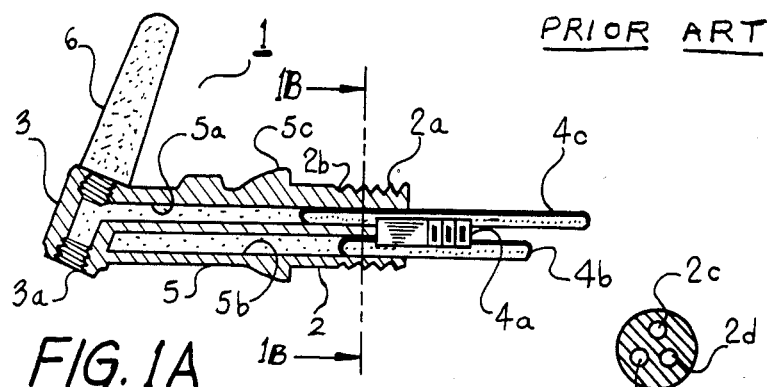
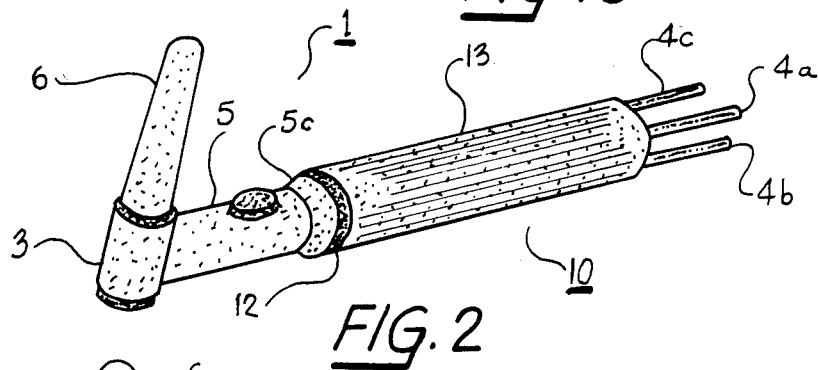
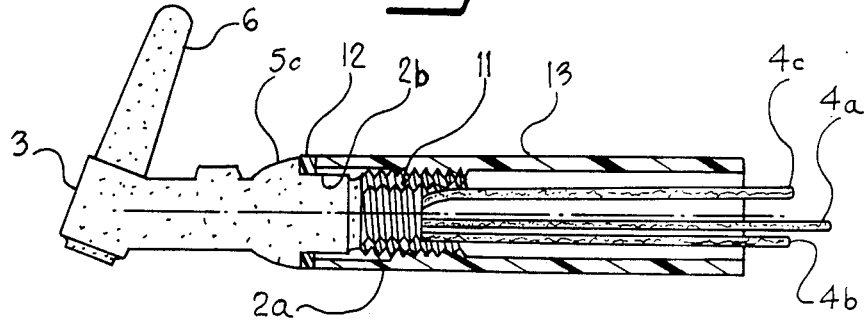
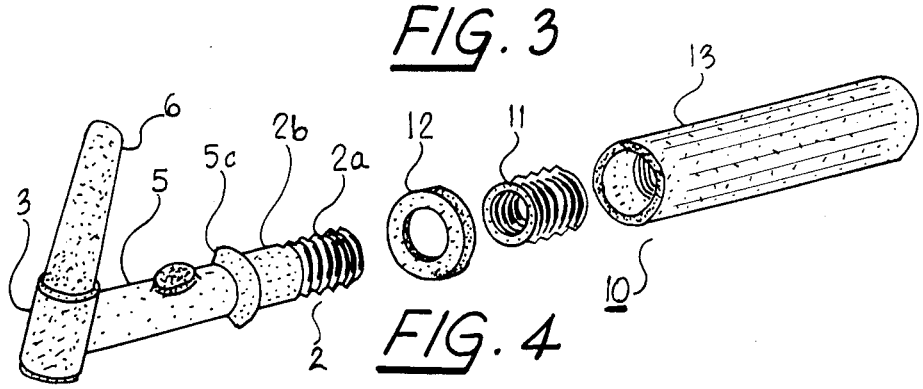

ADAPTER KIT FOR TUNGSTEN-INERT-GAS TORCHES

BACKGROUND OF THE INVENTION

This relates in general to manually operated welding torches, and more particularly, to adapter means for providing a handle for tungsten-inert-gas arc welding torches capable of utilizing high amperage power cables.

A well-known type of tungsten-inert-gas welding torch on the market for many years is customarily manufactured to include a torch body dimensioned to accommodate relatively small power cables. It is desirable in many welding operations to utilize power cables which carry of the order of 150 amperes current, together with hoses for water-cooling the welding head which are formed of synthetic material such as vinyl plastic.

A disadvantage which arises in initiating welding operations using high-power in cables of this type, is that if the cooling water does not come on, say, within 50 or 70 seconds after the electrical circuit has been turned on, the vinyl plastic hoses may crack from the heat generated in the torch body and break loose, causing the water to gush out, and subjecting the welder to the possibility of severe burns.

BRIEF DESCRIPTION OF THE INVENTION

Accordingly, the principal object of this invention is to dissipate the heat generated when the energizing circuit for a tungsten-inert-gas welding torch is turned on, to prevent the plastic water supply cables to the torch body from being heated up to a temperature at which they require. Another object of the invention is to protect the operator from the possibility of severe burns. A further object of the invention is to provide more comfortable gripping means for the operator of certain types of tungsten-inert-gas welding torches. A further object of the invention is to adapt a welding torch to the use of electrical cables using high amperage current, and to prevent leakage of high frequency power from welding torch body during generation.

These and other objects are realized in the adapter kit of the present invention constructed for accommodation on the bodies of certain types of high-powered, water-cooled inert-gas welding torches. This adapter kit comprises an internally and externally screw-threaded brass tube, which is constructed for accommodation on the external screw-threads of a terminal comprising a brass cable housing which projects axially from the right-hand end of the tubular body of a tungsten-inert-gas welding torch, for housing the water-cooling and electrical cables servicing the welding torch. Between the right-hand end of the internally and externally screw-threaded brass tube, when screwed into place on the screw-threaded cable housing, and an annular shoulder near the left-hand end of the torch body, is interposed a gasket of natural or synthetic rubber, or other insulating material, having inner and outer diameters just matching those of the right-hand outer face of the annular shoulder. An additional, elongated hollow cylindrical sleeve of phenolic resin, or other insulating material of the same outer dimeter as that of the gasket, but of slightly larger inner diameter, is screw-threaded for a portion of its inner surface. The elongated sleeve is superposed over and screwed onto the internally and externally threaded brass tube, which, in turn, has been screwed in coaxial relation to the screw-threaded brass cable housing. The end of the elongated sleeve is pushed flush against the surface of the gasket, which acts as a stop, resting against the projecting annular shoulder of the welding torch body.

A particular feature to be derived from use of the adapter kit of the present invention is that it permits the welding torch body to accept larger diameter power cables of a type presently on the market, which larger cables are adapted to carry electrical currents of up to, say, 500 amperes, and which may be insulated with reinforced braided rubber, or equivalent insulating material. A further advantage to be realized from use of the adapter kit of the present invention is that it prevents leakage of high frequency power from the body of the welding torch. Further, it protects the welding operator from possible burns, and makes a more comfortable handle for him to grasp during the welding operation.

These and other objects, features, and advantages of the invention will be understood from a detailed study of the specification hereinafter with reference to the attached drawings.

SHORT DESCRIPTION OF THE DRAWINGS

FIG. 1A is a schematic showing in side elevation, partially sectioned, of the body of a prior-art tungsten-inert-gas welding torch.

FIG. 1B is a section along the plane indicated by the arrows 1B—1B of FIG. 1A.

FIG. 2 is a perspective showing of a prior-art tungsten-inert-gas arc welding torch on the body of which the adapter handle combination of the present invention has been installed.

FIG. 3 is a perspective showing section of the body of a welding torch on which the adapter handle combination of the present invention, as shown in longitudinal diametrical section, has been installed.

FIG. 4 is an exploded perspective view showing the three piece adapter handle combination of the present invention in the process of installation.

DETAILED DESCRIPTION OF THE INVENTION

FIG. 1A shows, in schematic side elevation, partially sectioned, of the head and body of a tungsten-inert-gas arc welding torch of a type in general use in the prior-art, elements of which are described in detail in my U.S. Pat. No. 3,739,140, issued June 12, 1973 and in my U.S. Pat. No. 4,142,086, issued Feb. 27, 1979.

In general, the elements of the welding torch to which the adapter handle kit of the present invention is applied are formed of metal having a high conductivity for electricity, and a high melting point, such as, for example, beryllium, or various alloys of chromium and copper, and other metals, such an an alloy known in the art as "DURONZ", manufactured by the Bridgeport Brass Co., of Bridgeport, Conn. A welding torch of the type to which my invention is applicable comprises a tubular welding head 3, which is ½ inch in outer diameter and 5/16 inch in inner diameter, forms an inner cylindrical chamber which is about 3/16 inch along the axis. Head 3 has a downwardly-directed screw-threaded opening 3a which is adapted during operation to accommodate a holder for a tungsten welding rod, which is not shown. Screwed into the head 3 so that it extends coaxially about 1⅜ inch into its upper end is an insulating hard rubber, frustoconical handle 6.

The hollow cylindrical welding head 3, upon assembly, is securely fitted into the left-hand end of the tubular body portion 5 so that the axes of the two tubes form an internal angle, of, say, 113.5°. In the present embodiment, the tubular member 5 is ½ inch in outer diameter, ⅜ inch in inner diameter, and extends about 1¾ inches along the axis where it connects to the head portion 3. At its right-hand end, it has an annular shoulder 5c, the outer face of which terminates in an axially disposed cylindrical body 2, which extends, for example, 15/16 inch along the axis, having an annular collar 2b at its inner end and an externally screw-threaded portion 2a at its outer end. Body member 2 is solid except for three substantially symmetrically spaced bores, 2c, 2d, and 2e, which are disposed parallel to the tube axis, and accommodate the connecting tubes 4a, 4b and 4c, as shown in section in FIG. 1B.

The tube 4c leads to a source of inert gas, such as argon, which passes through the tube 5a in the torch body 5 to the cavity 3a of the welding head 3.

Tube 4b is connected to a source of cooling water, which passes into the body 5 through the annular tubing 5b, and passes out through the hose 4a. In addition to functioning as a cooling water inlet, tube 4b also serves as a conduit for an electrical lead which preferably connects to a D.C. transformer from which it carries high current, of the order of 100 to 500 amperes, depending on the weld to be performed, through the conducting body of the tube 5, and into the welding head 3.

The tube 4a, which in the present invention, is about 2¼ inches long, extends through the metal body member 2 parallel to the axis, to act as a drain for cooling water passing out of the chamber 5a of the body member 5.

When electrical current is turned on, if the water does not immediately come on, in 50 or 70 seconds, the vinyl hoses 4b and 4a become heated up to the breaking point whereby the water gushes out.

The adapter combination 10 of the present invention operates to prevent this problem. FIG. 2 is a perspective view of the adapter of the present invention assembled on the welding torch body shown in FIG. 1. This assembly is indicated in section, in FIG. 3, and in exploded view in FIG. 4.

The adapter combination comprises a brass tube 11 which is ⅞ inch long on the axis, which is threaded externally with 18 threads per inch. The brass tube 11 screws onto the externally screw-threaded portion 2a of the terminal tubular body 2 at the right-hand end of the welding torch body shown in FIG. 1. Over the brass tube 11 is superposed a gasket 12 made of an insulating material such as phenolic resin, which is ⅛ inch in axial thickness. Gasket 12 seats on the external annular shoulder 5c of the torch body 5. In addition, a larger handle 13 consisting of a tube or sleeve of phenolic resin or other insulating material, say 5 inches long, is interposed over the right-hand end of torch body 5, including the screw-threaded brass adapter 11. The phenolic tube 13 is internally screw-threaded near the end, with threads 20-to-the-inch, beginning at a plane perpendicular to the axis, ½ inch from the end, and extending 1 inch to the right in an axial direction. When this phenolic sleeve or tube 13 is put in place, it is moved to the left toward the welding torch body 5 until it contacts the external face of the gasket 12 which has been put in place against the external shoulder of 5a of the torch body 5. The external screw threads of the brass tube 11 are screwed into and mate with the internal screw threads of the phenolic sleeve or tube 13.

This arrangement permits the torch body 5 to accept a larger diameter power cable which passes in through 4b, and may be made out of reinforced braided rubber, or equivalent insulating material. Such power cables, which carry a high amperage, are in general use in the market today.

The handle 10 of my invention serves to prevent leakage of high frequency power. Most of the tungsten-inert-gas welding torches were designed some years ago, and will not accommodate cables of the present day size. The adapter kit of the present invention, makes it possible to use torches of a conventional type, widely in use, with the larger present day cables.

In operation using the adapter combination 10 of my invention, the power cable is preferably connected up to a 220 volt source, and carries current of approximately 150 amperes. The torch 1, including the adapter 10 of my invention, is used to weld stainless steel with no high frequency power leaks being detected therefrom. It has been found that before the cooling water comes on, which may be a period of about 1½ minutes, the handle 13 does not reach a temperature which makes it too hot to touch. Furthermore, when the cooling water passes into the torch body 5, there is no damage to the cables.

It will be understood that the present invention has been described with reference to an illustrative embodiment. The present invention is not to be construed as limited to the particular dimensions or materials mentioned by way of illustration, but only by the scope of the appended claims.

What is claimed is:

1. A welding torch comprising a welding head adapted to perform operations with a conventional electrode rod, and a body portion including means connectable to sources of electrical power and cooling water, said body portion including a shoulder projecting outwardly in a radial direction along the axis, forming an annular outer face normal to said axis; a terminal centered on said face comprising a tubular housing of highly conductive metal for accommodating the input ends of water cooling and electrical cables constructed to service said welding torch, wherein the portion of said tubular housing, commencing at the annular face of said shoulder, is substantially smooth and of slightly larger diameter than a screw-threaded portion at the opposite end of said terminal;

means for adapting said welding torch for operation at an electrical current in excess of about 100 amperes, said means comprising:

an internally and externally-threaded tube of high conductive metal constructed to screw onto the screw-threaded portion of said tubular cable housing in coaxial mating relation;

a gasket of heat and electrical insulating material constructed to be just accommodated on the smooth portion of said tubular cable housing, in flush relation to the annular outer face of said shoulder, and;

a sleeve of heat and electrical insulating material having substantially the same outer diameter of said gasket and having an internal screw-threaded portion commencing at a plane spaced-apart from its inner end an axial distance approximately exceeding the axial length of the smooth portion of said tubular housing and extending a substantial distance inwardly therefrom, said internal screw-threaded portion having an inner diameter constructed to screw onto the external threads of said internal and external-threaded tube when said tube is screwed in place on said tubular housing, and said sleeve constructed to make at its inner annular end flush with the outer face of said gasket in place against the outer face of said annular sleeve.

2. The combination in accordance with claim 1 wherein both said tubular cable housing and said internally and externally-threaded tube are essentially of brass.

3. The combination in accordance with claim 1 wherein said gasket and said sleeve consist essentially of a phenolic resinous material.

4. The combination in accordance with claim 1 wherein the axial length of said gasket is substantially less than the axial length of the smooth portion of said tubular cable housing adjacent said annular face of the shoulder of said torch body, and wherein the axial length of said sleeve substantially exceeds the axial length of said tubular housing as measured from the outer annular face of said shoulder.

* * * * *